3,462,496
Patented Aug. 19, 1969

3,462,496
METHOD OF MAKING MERCAPTO ALCOHOLS
Jon E. Fletcher and Rodney A. Nelson, Midland, Mich., assignors to The Dow Chemical Company, Midland, Mich., a corporation of Delaware
No Drawing. Filed Jan. 10, 1967, Ser. No. 609,714
Int. Cl. C07c *149/18*
U.S. Cl. 260—609      13 Claims

ABSTRACT OF THE DISCLOSURE

A method of making mercapto alcohols by reacting an excess of $H_2S$ under pressure with an epoxide, with or without an inert diluent, in the presence of an alkali or alkaline earth metal hydroxide, a trialkylamine, a quaternary ammonium hydroxide or chromium salts of fatty acids of 1 to 4 carbon atoms. The mercapto alkanols can be used for preparing polyesters, thiiranes or disulfides. They are also known to be useful as corrosion inhibitors and as components of textile sizing mixtures.

---

This invention relates to a method of making mercapto alcohols and more particularly pertains to a method of making mercapto alcohols in which the —SH and —OH groups are in alpha-beta relationship to each other, by reacting a vicinal epoxide with an excess of $H_2S$ under pressure in the presence of a catalyst. The reaction can be effected with or without solvent for the reactants. The catalyst can be an alkali metal or alkaline earth metal hydroxide or a hydrated form thereof; a chromium salt of a lower aliphatic carboxylic acid such as chromium acetate; a tertiary alkyl amine or a quaternary ammonium compound, particularly the hydroxides. The amount of catalyst can range from about .05 to about 20% by weight based on the weight of the epoxide.

The reaction of epoxides with $H_2S$ for the preparation of mercapto alcohols is known. However, all such preparations heretofore have a serious disadvantage of producing relatively low yields of the desired compounds, accompanied by comparatively large amounts of by-products such as linear and cyclic thioethers, which require costly separation steps. In other known processes a considerable amount of water is employed with NaHS or an alkali and flowing $H_2S$. In one such system the formation of thiodiglycol is said to be avoided by reacting NaHS with ethylene oxide, but the yield reported is only about 73.8% of theory and recovery of the mercapto alcohol required distillation of both the aqueous and organic phases formed during the reaction. The yield suggests that a fairly large amount of ethylene oxide either failed to react, was hydrolyzed to the glycol or homo-polymerized. In one catalytic method in which $H_2S$ and a 10% glycidol solution in aqueous alcohol are fed continuously into an aqueous alcohol diluent containing $Ca(SH)_2$, good yields of mercapto alcohols are reported, but the reaction must be run with relatively dilute epoxide solutions to avoid excessive by-product formation by reaction of the mercapto alcohol with the epoxide.

One of the advantages of this invention is that yields of mercapto alcohol of over 80% and generally about 88% to more than 99% of theory are readily obtainable. An important advantage is that high concentrations of epoxide can be used with extremely little by-product formation. Another advantage is that the reaction occurs over a fairly wide range but readily controllable temperature of from about 0° to about 100° C. Another advantage is that a large variety of epoxides can be reacted in the same equipment. Still another advantage is that mixtures of epoxide can be run, if desired, to produce a mixture of mercapto alcohols.

The procedure of this invention comprises commingling a liquid mixture of epoxide with or without an inert diluent and catalyst, with an excess of $H_2S$ maintained under a pressure of more than 50 p.s.i.g. in a reactor. The epoxide content of the feed can range from 35 to 100%.

Any unreacted $H_2S$ is flashed off after the requisite holding period. The crude mercapto alcohol may be employed directly or purified by filtration and distillation, if desired.

A solvent for the epoxide is not needed if the reactant is liquid at the feed temperature. However, solid epoxides are preferably dissolved in a liquid which is non-reactive with $H_2S$ or the epoxide prior to commingling with the $H_2S$. Representative solvents are lower alkanols such as methanol, ethanol, propanol, isopropanol, the butanols or any other mono-alkanol having up to 8 carbon atoms. The amount of solvent or diluent should not exceed 65% by volume of the mixture of diluent and epoxide. Water can also be employed, but it is not the preferred diluent for the reason that it forms an azeotrope with some of the mercapto alcohols and is not a good solvent for $H_2S$.

The epoxide can be an alkyl or cycloalkyl epoxide, which can be substituted with halogen groups, alkoxy groups, hydroxyl groups, aromatic groups, such as phenyl, naphthyl, tolyl or hydrocarbon substituted hydrocarbon rings, halo-aromatic groups, and phenoxy and ring-halogenated phenoxy groups.

Specific representative compounds which can be reacted include ethylene oxide, 1,2-propylene oxide, 1,2-butylene oxide, 2,3-butylene oxide, isobutylene oxide, glycidol, butyl glycidyl ether, cyclohexene oxide, styrene oxide, and ring-substituted derivatives thereof, including halogenated and alkylated styrenes, epichlorohydrin, epibromohydrin, epifluorohydrin, epiiodohydrin, diglycidyl ether, and the diglycidyl ether of Bisphenol A.

The pressure at which the reaction occurs is preferably the autogenous pressure of the $H_2S$ developed by feeding liquid $H_2S$ to the reactor and adjusting the reaction temperature, but it can range from 50 ot 1000 p.s.i.g. or more. The maximum pressure is dictated by the pressure retaining ability of the equipment employed. The amount of dissolved $H_2S$ can range from about 10% to about 30–40% at such pressure.

The preferred temperature of the reaction can range from 20 to about 65° C. and varies somewhat for each epoxide. The preferred range for ethylene oxide is 30–60° C. and for epichlorohydrin it is 20–40° C. Because the reaction is exothermic, cooling may be needed to maintain the temperature at the preferred range.

The catalysts which can be employed include alkali metal hydroxides, alkaline earth metal hydroxides or their hydrated forms, trialkylamines, quaternary amines, or chromium salts of lower saturated aliphatic organic acids having from about 1 to about 4 carbon atoms, a representative of which is chromic acetate. The preferred catalyst is $Ca(OH)_2$ or its hydrated form. Preferably the catalyst is added to the reactor as a slurry in a liquid glycol or other diluent which does not react with $H_2S$, although it can also be added to the reactor in a relatively dry state.

The ratio of $H_2S$ fed into the reactor must be at least slightly in excess, on a molar basis, over that of the epoxide feed. The molar ratio of $H_2S$ to epoxide can range from about 1.01 to about 5, but an excess over about 1.2 $H_2S$ to 1 of epoxide in the feed does not appear to have any effect on yield of mercapto alcohol. The preferred molar ratio is 1.05 to 1.3 of $H_2S$ to 1 of epoxide.

The examples which follow are intended to illustrate but not to limit the invention. All parts or percentages are by weight unless otherwise specifically indicated.

EXAMPLE 1

The reactor was stainless steel of one-gallon capacity equipped with a stirrer. The catalyst and a solvent, if one is used, are added to the reactor which is then purged with nitrogen, and cooled to about 15° C. The requisite amount of liquid $H_2S$ is then charged to the reactor and heated to the desired reaction temperature. The epoxide is then added slowly and, if desired, an assured excess of $H_2S$ can be maintained by addition thereof to the reactor as the reaction proceeds. The mixture is thereafter held for any post reaction period desired.

$Ca(OH)_2$ as a 20% by weight slurry in propylene glycol was added to the reactor in an amount equal to about .75% by weight based on the weight of ethylene oxide to be added. Sufficient $H_2S$ was fed into the reactor to provide a molar ratio of 1.1 based on the moles of ethylene oxide to be used. The mixture was heated to 52° C. and ethylene oxide was added for 6.5 hours at a rate of 140 g. per hour. The reaction mixture was held for four hours after addition of the ethylene oxide. The reaction temperature ranged between 52° C. and 67° C. The pressure after addition of the $H_2S$ was 500 p.s.i.g. and 25 p.s.i.g. at the end of the reaction period. The excess $H_2S$ was flashed from the mixture, which was filtered and analyzed by a vapor phase chromatographic procedure. The conversion of ethylene oxide to mercaptoethanol was 95% by weight.

EXAMPLE 2

A series of runs using various epoxides was made. For the first four runs the one-gallon reactor described in Example 1 was employed. The remaining three runs were made in a stainless steel reactor of one-liter capacity, but of similar design to that of the gallon size. Tabulated in the following table are data recorded during these runs. The catalyst in each run was $Ca(OH)_2$.

EXAMPLE 3

In this example a stainless steel pipe-reactor of 6″ x ½″ dimensions was employed. The procedure consisted of charging the desired amount of epichlorohydrin and catalyst to the reactor, weighing the charged reactor, sealing, cooling to Dry Ice temperature and evacuating to less than 10 mm. pressure. Hydrogen sulfide was then condensed into the reactor in the molar ratio desired. The reactor was again sealed, placed in a constant temperature oven and rotated at about 30 r.p.m. Additional agitation was provided with a polytetrafluoroethane bar in the reactor. With an $H_2S$ to epichlorohydrin ratio of 1.05 to 1, a temperature of 80° C., a $Ca(OH)_2$ concentration of 0.5 weight percent based on the epoxide and a reaction time of two hours, the conversion of epichlorohydrin to

$ClCH_2CHOHCH_2SH$ was 85%. When the $H_2S$-epoxide ratio was 1.2 to 1 with reaction conditions as above described, 90% weight percent of the epichlorohydrin was converted to chloro-3-mercapto-2-propanol.

EXAMPLE 4

A series of runs was made using the procedure described in Example 3, but varying the epoxide, the catalyst and its concentration, and ratio of $H_2S$ to epoxide. Tabulated below are the data obtained in these runs.

TABLE II

| Run No. | Epoxide | Mole Ratio $H_2S$/Epox. | Degree C. | Time, Hrs. | Catalyst and weight percent on Epoxide | Percent Conversion to Mercap. Alc. |
|---|---|---|---|---|---|---|
| 1 | Propylene Oxide | 2.2/1 | 74 | 8 | $Ca(OH)_2$, .5 | 90 |
| 2 | do | 1.05/1 | 74 | 6 | $Ca(OH)_2$, .5 | 90 |
| 3 | 1,2-Butylene Oxide | 1.1/1 | 85 | 4.2 | $Ca(OH)_2$, .75 | 95 |
| 4 | do | 1.1/1 | 85 | 4.2 | $Ca(OH)_2$, .32 | 95 |
| 5 | do | 1.2/1 | 85 | 24 | $Ba(OH)_2$, .5 | 90 |

EXAMPLE 5

In this test the reactor was a stainless steel ampoule of about 15 cc. capacity. The procedure followed was that described in Example 3 with the exception that the cooling in Dry Ice was omitted and $H_2S$ was added to the catalyst-epoxide mixture by a pressurized technique. The ratio of $H_2S$ to 1,2-butylene oxide was 1.56 to 1. Reaction time was three hours at a temperature of 85° C. The catalyst was chromic acetate at a concentration of .75

TABLE I

| Run | Epoxide | Mole Ratio $H_2S$ to Epox. | Weight Percent Catalyst on Epox. | Degree C. Init. | Degree C. Fin. | Pressure, p.s.i.g. Init. | Pressure, p.s.i.g. Fin. | Hours Post Time | Hours Epox. Add'n. | Addition Rate, gr./hr. | Percent Conversion to Mercapto Alcohol |
|---|---|---|---|---|---|---|---|---|---|---|---|
| 1 | Epichlorohydrin | 1.2 | .75 | 50 | 85 | 485 | 340 | 3.5 | 1.25 | 1,600 | 95 |
| 2 | Propylene Oxide | 1.1 | .75 | 51 | 67 | 500 | 0 | 0.5 | 4.5 | 240 | 98 |
| 3 | 1,2-Butylene Oxide | 1.1 | .75 | 50 | 90 | 485 | 60 | 2.0 | 5.0 | 285 | 97 |
| 4 | Isobutylene Oxide | 1.1 | .75 | 45 | 68 | 430 | 70 | 3.0 | 6.0 | 181 | 95 |
| 5 | Glycidol | 1.3 | 1.5 | 45 | 100 | 500 | 380 | 1.0 | 4.0 | 100 | 92 |
| 6 | Styrene Oxide | 1.1 | 1.5 | 50 | 65 | 510 | 280 | 2.0 | 2.0 | 240 | 90 |
| 7 | Butyl-Glycidol Ether | 1.1 | 1.5 | 45 | 75 | 500 | 180 | 1.0 | 3.0 | 235 | 95 |

When epichlorohydrin is employed as a reactant it is preferred to avoid temperatures much in excess of about 85° C., because certain side reactions result in the formation of undesired by-products.

The importance of maintaining a mol ratio of $H_2S$ to epoxide of at least 1 is shown in a comparative run in which 0.5 mol of $H_2S$ per mol of propylene oxide was employed with 0.6 weight percent $Ca(OH)_2$, based on the epoxide. The temperature range was 51–94° C. The epoxide was fed into the reactor at a rate of 330 g. per hour for 6.5 hours and post reacted for two additional hours. The pressure was 500 p.s.i.g. initially and 16 p.s.i.g. at the end of the run. There was little or no mercaptopropanol detected in the end product. Analysis showed more than 99% conversion of the propylene oxide to

$S(CH_2CHOHCH_3)_2$.

weight percent based on the weight of 1,2-butylene oxide. The yield of 1-mercapto-2-butanol was 90%.

EXAMPLE 6

This example describes a continuous process for making the mercapto alcohols.

The equipment consisted of a stainless steel reactor equipped with a stirrer, a stainless steel heat-exchange coil, inlet lines for catalyst, epoxide and $H_2S$ at the top and an outlet line connected to a stainless steel post-reactor of ½-liter capacity. The post-reactor was connected to a collecting tank having a line for venting excess $H_2S$ for recovery or recycle. The epoxide feed was controlled by a level control device connected to the one-liter reactor. Catalyst feed was adjusted to a predetermined proportion of the epoxide feed and $H_2S$ was fed continuously to assure that an excess was present in the reactor.

The reactor and post-reactor were filled to operating levels with product obtained from batch reactions. The reactor was then purged with nitrogen for 5-10 minutes, pressured to 20 p.s.i.g. and heated to the desired temperature. $H_2S$ was fed into the reactor and a 40% $Ca(OH)_2$ slurry in propylene glycol was pumped into the reactor until the initially desired concentration is reached. Finally, the epoxide is added while removing product from the reactor and actuating the epoxide delivery pump by means of the level control device. The throughput of the reactor is fixed by the feed rate of the epoxide. The level control device was adjusted so that it started the epoxide feed pump when a liquid reaction volume of about 675 ml. was reached and the pump was shut off at about a 725 ml. liquid level. Tabulated in Table III are data obtained on reaching steady state in runs using epichlorohydrin and ethylene oxide to prepare 1-chloro-3-mercapto-2-propanol and mercaptoethanol, respectively.

TABLE III

| Run No. | Epoxide Reacted | Temp., °C. | Pressure, p.s.i.g. | $Ca(OH)_2$, percent by wt. | $H_2S$, percent by wt. | Percent Epoxide in Reactor | Mercapto Alkanol, percent by wt. | Through put, g./hr |
|---|---|---|---|---|---|---|---|---|
| 1 | Epichlorohydrin | 25 | 165 | 1.7 | 20 | 0.3 | 97.0 | 780 |
| 2 | do | 55 | 340 | 1.4 | 25 | Nil | 91.1 | 450 |
| 3 | do | 60 | 340 | 1.4 | 22 | <1 | 91.4 | 800 |
| 4 | do | 58 | 345 | 2.0 | 24 | Nil | 88.9 | 890 |
| 5 | Ethylene oxide | 38 | 130 | 2.3 | 15 | Nil | 98.5 | 757 |

The catalyst percentage was based on the total charge. The percentage of $H_2S$ was determined on the reactor contents. The percentage of mercaptoalkanol was determined on the centrifuged crude mixture from which $H_2S$ had been removed and calculated on a propylene-glycol-free basis.

EXAMPLE 7

A solution of 8.75 g. trimethylamine dissolved in 100 g. isopropylalcohol and 10 ml. of butylene oxide was placed in the one-liter autoclave described above. The temperature of the mixture was adjusted to 45° C. and the autoclave was pressurized to 100 p.s.i.g. with $H_2S$. Then 425 parts of butylene oxide were fed into the reactor gradually, while maintaining the pressure at 95 to 105 p.s.i.g., until no pressure drop was noticed. The temperature varied between 45 and 64° C. during the run. The mixture was then removed and the ingredients were separated by fractional distillation. The mercaptobutanol recovered by this means was 80% of theory.

The importance of maintaining $H_2S$ under pressure so that a molar excess over epoxide is always maintained is shown by the following comparative runs in which a round-bottom flask, equipped with an agitator, a dropping funnel, a condenser, cooled with solid $CO_2$ and an inlet for continuous addition of $H_2S$ at atmospheric pressure, was charged with 25 g. of an 80% isopropanol-20% water mixture and 0.5 g. of $Ca(OH)_2$. Gaseous $H_2S$ was fed into the flask until a steady reflux of liquid $H_2S$ was observed. Addition of $H_2S$ was continued to provide a steady reflux during the entire reaction. A solution of epoxide in 80% isopropanol-20% water was added slowly from the dropping funnel while maintaining the temperature at 25-30° C. After about one-half the epoxide was added, a second 0.5 g. portion of $Ca(OH)_2$ was added as a slurry in a small amount of the isopropanol solvent. The epoxide appeared to react vigorously, so that there was little unreacted ingredient in the flask at any time. After completing the addition of the epoxide, the mixture was heated to 40° C. and then flushed with nitrogen at this temperature to remove dissolved $H_2S$. The results are tabulated below.

TABLE IV

| Epoxide | Solvent | Percent Solvent in Feed | Percent $Ca(OH)_2$ | Weight Glycidol (gr.) | Weight Product (gr.) | Percent Sulfides in Product |
|---|---|---|---|---|---|---|
| Glycidol | 80% isopropanol/20% water | 90 | 0.5 | 15 | 20 | 10 |
| Do | do | 80 | 0.5 | 30 | 40 | 21 |
| Do | do | 65 | 0.5 | 52.5 | 70 | 28 |
| Do | do | 40 | 0.5 | 90 | 111 | 53 |
| Do | None | 0 | 0.3 | 110 | 124 | 100 |

These data show that even when operating at low temperatures, good yields of mercapto alcohols are not obtained at atmospheric pressure, except in fairly dilute solution.

In a second series of comparative runs in which isopropanol and catalyst were added to the reactor and then pressurized to 25 p.s.i.g. with $H_2S$ before starting to feed propylene oxide and maintaining the $H_2S$ at about 20 p.s.i.g. and the temperature at 15-25° C., it was found that about 10% $CH_3CHOHCH_2$—S—$CH_2CHOHCH_3$ formed when the weight ratio of propylene oxide to solvent was 0.6 to 1, and 50% of the sulfide formed when the ratio was 2.3 to 1.

The mercapto alkanols are useful for preparing disulfides by oxidation, in the preparation of polyesters and as intermediates for the preparation of other compounds, such as thiiranes. Mercaptoalkanols are also useful as corrosion inhibitors and as components of textile-sizing compositions.

We claim:
1. A method of preparing hydroxy thiols comprising commingling a vicinal epoxide having 2 to 18 C atoms selected from the class consisting of alkyl and cycloalkyl hydrocarbon epoxides and halogen, alkoxy, hydroxy, aromatic hydrocarbon, halo-aromatic hydrocarbon and phenyloxy substituted derivatives of said epoxides, in liquid form containing from 0-65% by volume of inert diluent with a stoichiometric excess of $H_2S$ under a pressure in excess of 50 p.s.i.g. in the presence of a catalyst selected from the class consisting of alkali metal and alkaline earth metal hydroxides, chromium salts of lower fatty acids, having 1-4 C atoms, at a temperature of from about 0 to about 100° C.

2. The method of claim 1 in which the epoxide is an aliphatic epoxide of 2-7 C atoms.

3. The method of claim 1 in which the epoxide is ethylene oxide.

4. The method of claim 1 in which the epoxide is epichlorohydrin and the reaction temperature ranges from 0 to 85° C.

5. The method of claim 1 in which the epoxide is propylene oxide.

6. The method of claim 1 in which the reactants and catalyst are fed and withdrawn from the reactor in a substantially continuous stream.

7. The method of claim 6 in which the epoxide is epichlorohydrin.

8. The method of claim 6 in which the epoxide is ethylene oxide.

9. The method of claim 6 in which the epoxide is propylene oxide.

10. The method of claim 6 in which the catalyst is $Ca(OH)_2$ and is present in the reaction mixture in a concentration of from about 0.05 to about 20% by weight based on the weight of the epoxide.

11. The method of claim 10 in which epichlorohydrin is the epoxide and the reaction temperature is 20–40° C.

12. The method of claim 10 in which the epoxide is ethylene oxide and the reaction temperature is 30–60° C.

13. The method of claim 10 in which the epoxide is propylene oxide.

References Cited

UNITED STATES PATENTS 3,394,192  7/1968  Jones _____ 260—609

FOREIGN PATENTS 910,296  4/1954  Germany.

OTHER REFERENCES

Sjöberg, "Chem. Abstracts," vol. 33 (1939), p. 2106.

CHARLES B. PARKER, Primary Examiner

D. R. PHILLIPS, Assistant Examiner